(12) United States Patent
Ely

(10) Patent No.: US 9,101,203 B2
(45) Date of Patent: Aug. 11, 2015

(54) EXTERIOR-ANCHORED AUTOMOBILE HAMMOCK

(71) Applicant: Hanson Eugene Ely, Richmond, VA (US)

(72) Inventor: Hanson Eugene Ely, Richmond, VA (US)

(73) Assignee: Hanson Ely, Richmond, VA (US)

( * ) Notice: Subject to any disclaimer, the term of this patent is extended or adjusted under 35 U.S.C. 154(b) by 0 days.

(21) Appl. No.: 14/572,072

(22) Filed: Dec. 16, 2014

(65) Prior Publication Data

US 2015/0173496 A1 Jun. 25, 2015

Related U.S. Application Data

(60) Provisional application No. 61/917,108, filed on Dec. 17, 2013.

(51) Int. Cl.
| | |
|---|---|
| *A45F 3/22* | (2006.01) |
| *A45F 4/08* | (2006.01) |
| *A45F 3/24* | (2006.01) |
| *B60N 3/00* | (2006.01) |
| *A45F 3/00* | (2006.01) |

(52) U.S. Cl.
CPC ... *A45F 3/24* (2013.01); *A45F 3/22* (2013.01); *B60N 3/008* (2013.01); *A45F 3/00* (2013.01)

(58) Field of Classification Search
CPC .............. A45F 3/00; A45F 3/22; A45F 3/24
USPC ............ 5/118–120, 121, 122, 123, 127, 128, 5/129, 130
See application file for complete search history.

(56) References Cited

U.S. PATENT DOCUMENTS

| | | | | | |
|---|---|---|---|---|---|
| 2,260,584 | A | * | 10/1941 | Schuck et al. | 5/94 |
| 4,221,424 | A | * | 9/1980 | Eiserman et al. | 296/152 |
| 5,170,521 | A | * | 12/1992 | Light | 5/118 |
| 6,418,577 | B1 | * | 7/2002 | Murphy | 5/127 |
| 2005/0236874 | A1 | * | 10/2005 | Godshaw et al. | 297/35 |
| 2005/0253444 | A1 | * | 11/2005 | Godshaw et al. | 297/452.12 |
| 2009/0091165 | A1 | * | 4/2009 | Thompson | 297/228.12 |
| 2009/0205131 | A1 | * | 8/2009 | Bishop | 5/118 |
| 2010/0050338 | A1 | * | 3/2010 | Overtone | 5/118 |
| 2014/0345048 | A1 | * | 11/2014 | Mueller | 5/119 |

* cited by examiner

*Primary Examiner* — Robert G Santos
*Assistant Examiner* — David E Sosnowski
(74) *Attorney, Agent, or Firm* — Hanson Ely

(57) ABSTRACT

An exterior-anchored automobile hammock is used to provide a suspended sleeping apparatus inside a four-door automobile. The exterior-anchored automobile hammock has a main hammock structure, a front windshield strap and buckle, a rear windshield strap and buckle, and a roof strap and buckle. The exterior-anchored automobile hammock is anchored to the vehicle via two front end anchors, two rear end anchors, and a roof strap. All five anchored sections are adjustable for various sizes of automobiles and user preferences. The exterior-anchored automobile hammock suspends over the automobiles interior, with the front seats reclined, allowing the user or users to lie perpendicular to the automobile's axels or diagonally from door to door if more room is needed.

7 Claims, 3 Drawing Sheets

EXTERIOR-ANCHORED AUTOMOBILE HAMMOCK

CROSS-REFERENCE TO RELATED APPLICATIONS

This application claims an invention which was disclosed in U.S. Provisional Application No. 61/917,108, filed Dec. 17, 2013, entitled PORTABLE SLEEPER.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable

STATEMENT REGARDING PRIOR DISCLOSURES BY THE INVENTOR OR A JOINT INVENTOR

Not Applicable

BACKGROUND OF INVENTION

The invention relates to devices used for sleeping inside of automobiles with more than two doors. More specifically, the present invention pertains to a hammock-like apparatus that allows the user to sleep inside of an automobile by being suspended above all of the seats, with the front driver and passenger seats reclined.

Many common passenger automobiles do not provide a comfortable place to sleep. Road warriors and travelers alike drive while they are sleep deprived and exhausted due to the lack of comfortable sleeping options. The driver can pull off the side of the road and sleep in the reclined front seat and risk the potential for back and neck pain, he/she can rest in the back seat which does not provide enough room for the average adult to lie down without bending his/her knees or neck, or purchase, a hotel room for the required resting period. The driver's unwillingness to sleep in the front seat or lie down in the back seat due to the uncomfortable nature of both options coupled with the potential lack of funds for a hotel room result in the driver operating the automobile in an exhausted altered state in order to reach his/her destination where a comfortable sleeping situation awaits. This altered state driving could endanger himself/herself as well as other driver's on the road. It would be advantageous to be able to set up a sleeping apparatus that goes on the inside of one's automobile that provides a comfortable sleeping platform where an average adult, male or female, can lie down and rest in the security of his/her own automobile.

There are sleep devices for use in and around automobiles that are set up on the roof of an automobile, adjacent to an automobile, or in the bed of a truck. However, these devices do not use the structural integrity of the automobile to provide a suspended sleeping apparatus inside the automobile nor do they provide the protection from weather conditions that the user's own automobile would. Furthermore, these devices are located outside of the automobile Sleep apparatuses may also be located inside of a cab or passenger compartment. These devices usually contain a sleeping platform that rests on or coincides with the existing seats in the cab or passenger compartment. However, these devices confine the sleeper to the space between the doors or walls of the compartment where the user must lay parallel to the automobile's axels and thus creating an uncomfortable situation for any user whom may be taller than that space provided. Also, these devices would not be applicable to the user of a common passenger automobile such as a four-door sedan for as the center console or armrest would prohibit the device from lying flat. And the device would be unnecessary in the back seats because there is no partition where these devices would be needed. It would be advantageous to provide the user with a comfortable sleeping position that was not restricted to the width of the interior of the automobile and that is applicable to common passenger automobiles.

Suspendable sleeping apparatuses for use in a automobile are also known. U.S. Pat. No. 4,331,424 to Eiserman, discloses a hammock-like sleeping device which suspends between the doors of a semi-truck cab. However, the Eiserman device would not be useful for a common passenger automobile due to the variation of clearance from the seats and center console/arm rest to the top of the window where the device is secure. If used in a common passenger automobile, the Eiserman device would sag so low that the user's body would touch the center console/arm rest or would leave the user's face very close to the automobile's ceiling, both downfalls render an uncomfortable sleeping scenario. Also, the Eiserman device only has two anchor points on the automobile which could damage and compromise the structural integrity of the automobile, especially if the weight inside the device is greater than 300 pounds, and may leave automobile unsafe to operate. The Eiserman device also does not enclose the user inside the automobile which could result in injury to the user if he/she would fall out of the device while sleeping. By suspending the user between the doors of the automobile, the Eiserman device restricts the length of the sleeping apparatus to the distance between the two doors. This does not provide ample sleeping space for an average adult male or female, especially when the device is being implemented in a common passenger automobile. It would be advantageous to provide a suspendable sleeping apparatus that could be used in common passenger automobiles where the user was not restricted to lying down by the space between the doors and was secured inside so the user does not fall out. Furthermore, it would be advantageous to have more than two anchor points on the automobile so the weight inside the device is distributed more evenly so as not to damage the automobile and compromise the automobile's safety. It would also be advantageous to have a suspended sleeping device that could suspend over most of the automobile's interior so the user could comfortably lie down perpendicular to the automobile's axels and not be touching the center console/arm rest or the automobile's seats.

U.S. Pat. No. 8,117,691 issued to Bishop is an updated version of Eiserman's device that entails a suspended sleeping device for use in vehicles, horse trailers, semi-truck cab's, and also for use in alternative environments such as a free standing frame assembly or stand. Bishop's device has similar disadvantages to Eiserman's device when using the device on a common passenger automobile like a four-door sedan. When attaching it to an automobile, Bishop's device suspends between two doors of the automobile and contains multiple anchor points on the automobile's door, door frame, and window allowing the user to set it up while inside the vehicle via access to the door and window. The strength of the window and door frame on a common passenger automobile may come into question when supporting a large person or two people.

Bishop's device can be adjusted with two ratcheting buckles that adjust the tension in the device which would raise and lower the user to the desired height. However, because the anchor points are at the top of the window and door frame, the user's head would be very close to the ceiling of the automobile which is not a comfortable sleeping scenario. Also, ratcheting buckles, although they may seem simple to the familiar user, can be a bit tricky and confusing to a person who has never used one before. Bishop's device is adjustable to take in account for users of different heights. However, since the device is suspended from door to door and the user lays parallel to the automobile's axel, the width of the automobile restricts the length of the sleeping device and the center console/arm rest would limit the adjustable sag in the apparatus before the user is resting on the automobile's interior, especially in a passenger automobile like a four-door sedan. Similarly, since Bishop's device has a limited width and is restricted to the width of the window and door frame, it would be very difficult for more than one person to sleep in the device. Since Bishop's device is secured by the doors and windows of the automobile it may cause a safety hazard to the user if there was a sudden need to escape the automobile, such as a fire. In case of a fire or other endangerment inside the automobile the user would be suspended in a device that ties the doors together, ensuring a slow escape because the user would have to undo the suspended sleeping apparatus in order to use the door. It would be beneficial to have a device that was independent of the doors and windows and did not restrict the doors from opening while the user is lying in it. It would also be advantageous to provide a suspended sleeping apparatus that suspends over the automobile's interior, with the front seats reclined, that allows the user or users to sleep perpendicular to the automobile's axels or diagonally across the interior space and thus utilizing more space above the seats. It would also be beneficial for the device to anchor to the exterior of the car where the highest point of the sleeper material is near the middle of the windshields allowing the user to sleep above the automobile's interior but without being uncomfortably close to the ceiling of the car or resting on the center console/armrest of the interior. Also, for ease of use, it would be advantageous to use tension adjusting devices that the average adult is familiar with such as a side release buckles and ladder locks that can be found on a book bag, hiking pack, or dog leash/collar.

BRIEF SUMMARY OF INVENTION

The exterior-anchored automobile hammock provides a suspended apparatus inside of a four door automobile. It is intended to be used as a sleeping or resting platform for weary travelers that drive relatively small automobiles, like sedans. The exterior-anchored automobile hammock attaches to the exterior of the automobile through a plurality of straps and anchors that utilize the automobile's front and rear windshields, trunk, and hood. And although the user is required to exit the vehicle to set up the exterior-anchored automobile hammock, the resulting platform suspends above the automobiles' seats and interior, with the seats reclined, where the user, or users, lay. By utilizing the space above the interior of the vehicle, it allows the user(s) to lay longitudinally in the automobile, perpendicular to the automobile's axels and not restricted by the distance between the automobile's doors. This extra space allows for multiple users to lie in the exterior-anchored automobile hammock. Since the doors of the automobile close on top of the supporting strapping it allows the user(s) to exit the automobile quickly without having to undo any of the buckles or straps which would be very beneficial in case of an emergency where the user would need to exit the automobile quickly. The exterior-anchored automobile uses straps that anchor onto the front of the automobile and the rear of the automobile with related straps that rest on the outside of the front windshield and the outside of the rear windshield. This allows the user to vary the height at which the user would sleep inside the automobile and thus not be uncomfortably close to the roof of the automobile. This plurality of straps allows the weight of the user to be displaced over a plurality of points on the automobile so as to not compromise the integrity of the automobile which may render it unsafe to operate. The buckles used in the exterior-anchored automobile hammock are akin to a single-adjust side release buckle which is a very common type of buckle and thus would be very familiar to most users.

DETAILED DESCRIPTION OF INVENTION

The following presents an example of an embodiment of an exterior-anchored automobile hammock 50. The following detailed description and illustrations refer to the exterior-anchored automobile hammock 50 for use with an automobile and more specifically to be suspended inside an automobile with four doors, front and rear windshields, and a latchable hood and trunk. The sole embodiment of the exterior-anchored automobile hammock 50 would be on a 4-door sedan or similar passenger automobile; without the automobile the exterior-anchored automobile hammock 50 would be rendered useless.

Figure 1:
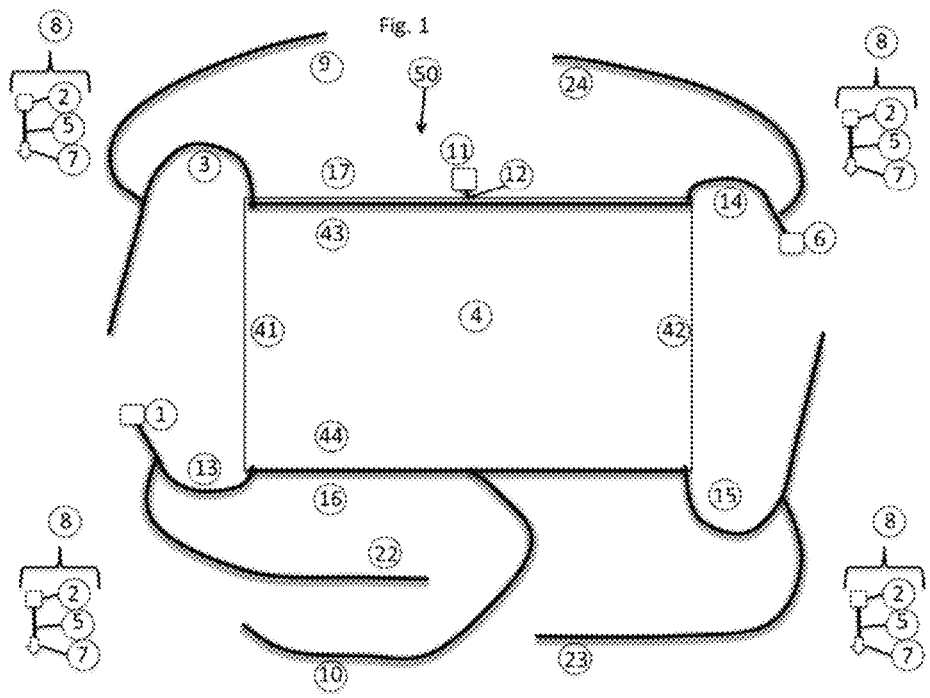
FIG. 1 is a view of the exterior-anchored automobile hammock from above as if it were spread out lying on the ground with the anchoring system accompanying it.

FIG. 1 illustrates a view of the exterior-anchored automobile hammock 50 as if it were to be laid out on the ground and viewer is hovering above it. It displays the multitude of straps and anchors in a laid out manner. As shown in FIG. 1, the exterior-anchored automobile hammock includes a main hammock structure 4 that is rectangular in shape, but is contemplated that the main hammock structure 4 may be formed of any shape without departing from the overall scope of the present invention. The main hammock structure 4 may be formed of different lengths and widths to compensate for different size automobiles. The main hammock structure 4 is generally composed of a textile or similar material of sufficient strength to support an individual or individuals and the associated force or weight of an individual or individuals thereon, as well as to withstand stresses placed upon the exterior-anchored automobile hammock 50 thereby. To this end, the main hammock structure 4 may be formed of wool, nylon, polyester, canvas, polypropylene, or any other animal, mineral, plant, or synthetic textile. The main hammock structure 4 may also be formed of elastic or stretchable materials, such as spandex or elastane.

In FIG. 1, the main hammock structure 4 may include a horizontally running front dashboard side 41 that runs parallel to the automobile's axels, when set up, and a rear backseat side 42 that also runs parallel to the automobile's axels, when set up. The main hammock structure 4 also contains a longitudinally running driver's side 44 and a longitudinally running passenger's side 43 that both run perpendicular to the automobile's axels when set up. The longitudinally running sides 43 and 44 of the main hammock structure 4 that run perpendicular to the automobiles axels, when set up, and parallel to each other, will always be larger than the horizontally running sides of the main hammock structure that run parallel to the automobile's axels, and parallel to each other, when set up. Permanently attached to the longitudinally running driver's side 44 of the main hammock structure 4 is the main hammock driver's side webbing 16 that runs the entire length of the longitudinally running driver's side 44. Similarly, the longitudinally running passenger's side 43 of the main hammock structure 4 has the main hammock's passenger side webbing 17 permanently attached to it. The longitudinally running passenger's side 43 and the main hammock's passenger side webbing are the same length and run the same distance together.

Figure 3:
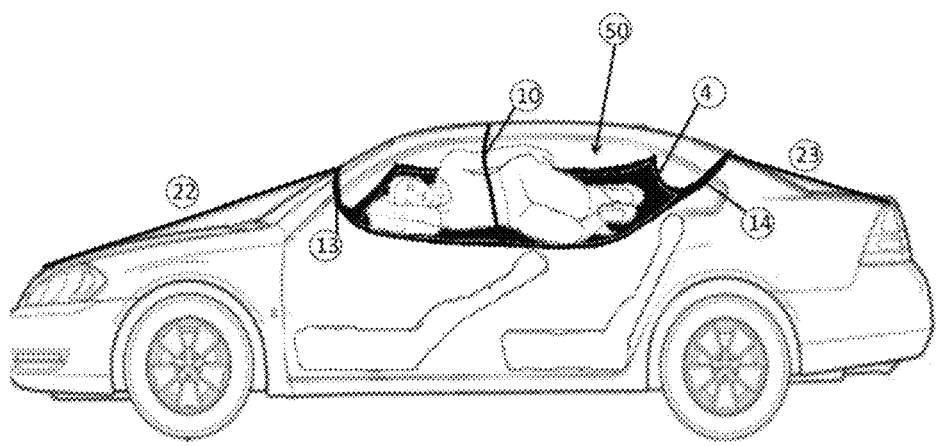
FIG. 3 is a view of the exterior-anchored automobile hammock as it is set up on a 4-door sedan from the driver's side of the automobile with the seats reclined.
Figure 5:
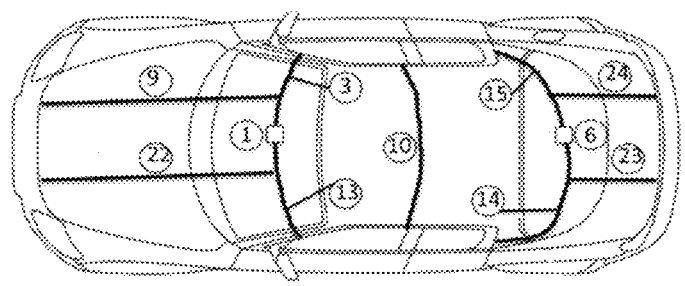
FIG. 5 is a view of the exterior-anchored automobile hammock set up on a 4-door sedan from above the automobile showing the rear windshield strapping system, the front windshield strapping system, and the roof strap.
Figure 6:
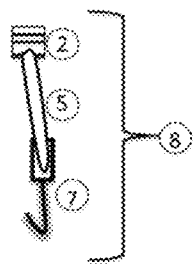
FIG. 6 is a view of the anchor system that includes the ladder lock, connecting strapping, and rubber coated anchor.

Permanently attached to the middle of 16 and 44 is the roof strap 10 that, when set up, extends over top of the automobile's roof where the loose end threads into the roof strap buckle 11 that is permanently attached to the middle of 17 and 43 via the roof strap buckle webbing connector 12. The roof strap buckle 11 has an adjustable side that is used to vary the support length of the roof strap 10 which would be required for automobiles with varying roof heights and widths. The alternate side of the roof strap buckle 11 is permanently connected to 17 and 43. A good example of what type of buckle the roof strap buckle 11 could be is a single-adjust side release buckle. When set up, 10 provides additional support in the middle of 4 so the user does not sag too low that he/she is resting on the automobile's interior. The roof strap 10 is shown in FIGS. 3 and 5 with a more accurate representation of its ability to help support the user or users in FIG. 3.

Figure 2:
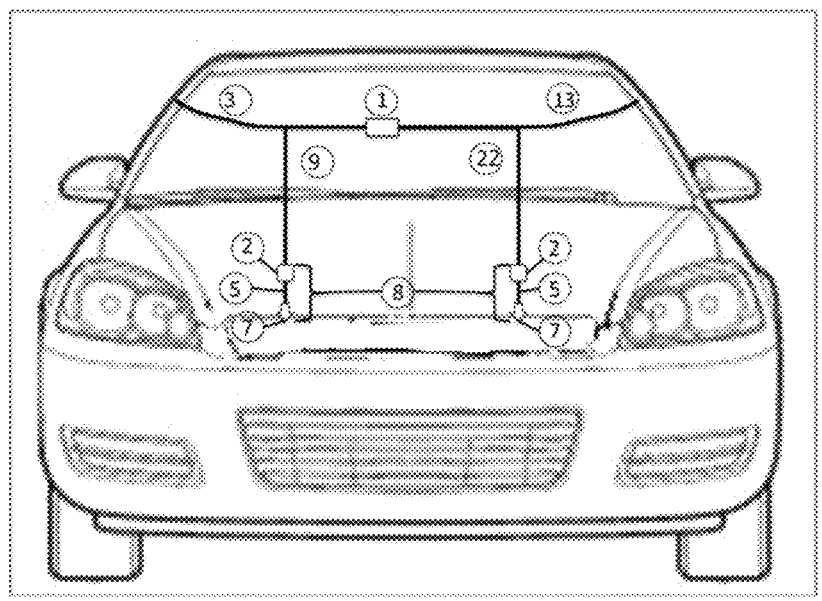
FIG. 2 is a view of the exterior-anchored automobile hammock as it is set up on a 4-door sedan from the front of the automobile showing the front windshield strapping system and accompanying anchor system.

Extending off of 16 is the driver's side windshield strap 13 which, when set up, will extend in between the automobile driver's side door and door jam and across the front windshield of the automobile. Permanently attached to the other end of 13 is the front windshield buckle 1. The passenger's side front windshield strap 3 has an attached end, to 17, and a loose end. Extending off of 17 is 3 which, when set up, will extend in between the passenger side door and door jam and over the front windshield of the automobile. The loose end of 3 would then thread through the adjustable end of 1 and would then be adjusted to the size of the automobile, more specifically its front windshield, that 50 is being set up on. A good example of what type of buckle 1 could be is a single-adjust side release buckle. The passenger's side front anchor strap 9 and the driver's side front anchor strap 22 have a permanently attached end and a loose end. 9 is permanently attached to 3 at about 3's midway point and 22 is permanently attached to 13 near 13's midway point. When set up, both 9 and 22 will run perpendicular to 3 and 13, respectively, and attach to the anchoring systems 8 by threading through the respective ladder locks 2. FIG. 2 depicts the front side of an automobile and the corresponding parts of 50 that attach to the front side of the automobile.

Figure 4:
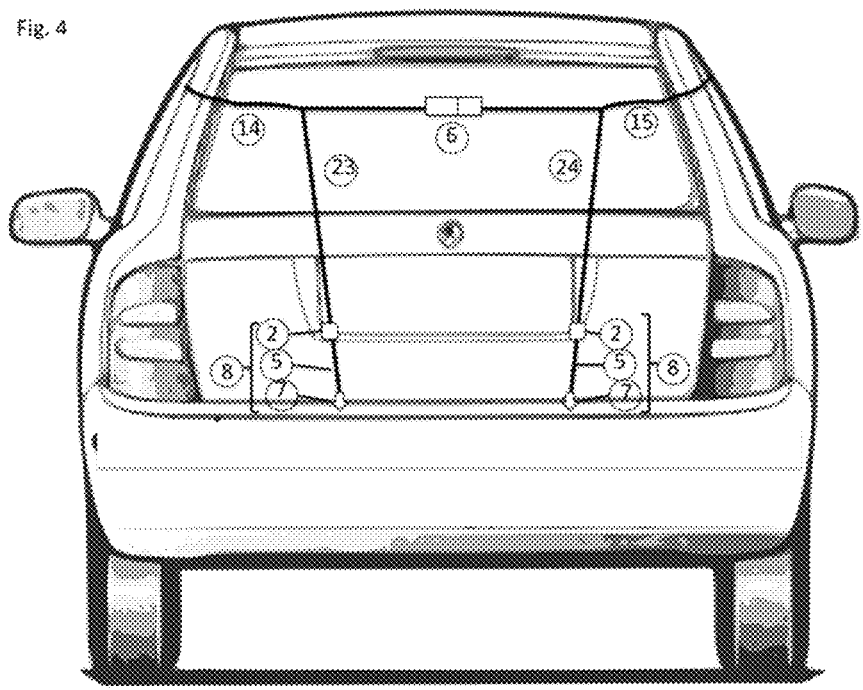
FIG. 4 is a view of the exterior-anchored automobile hammock as it is set up on a 4-door sedan from the rear of the automobile showing the rear windshield strapping system and accompanying anchor system.

The driver's side rear windshield strap 15 has an attached end, to 16, and a loose end. Extending off of 16 opposite of 13 is 15 which, when set up, will extend in between the automobile driver's side rear seat door and door jam and across the rear windshield of the automobile where the loose end will meet the rear windshield buckle 6. Extending off of 17, opposite of 3 is the rear windshield passenger's side strap 14 which, when set up, will extend through the passenger's side rear door and door jam of the automobile and around the rear windshield where it is permanently connected to 6. The loose end of 15 would then thread through the adjustable end of 6 and would then be adjusted to the size of the automobile, more specifically its rear windshield, that 50 is being set up on. A good example of what type of buckle 6 could be is a single-adjust side release buckle. The rear driver's side anchor strap 23 and the rear passenger's side anchor strap 24 have a permanently attached end and a loose end. 24 is permanently attached to 14 at about 14's midway point and 23 is permanently attached to 15 near 15's midway point. When set up, both 23 and 24 will run perpendicular to 15 and 14, respectively, and attach to 8 by threading through 2. FIG. 4 depicts the rear side of an automobile and the corresponding parts of 50 that attach to the rear side of the automobile.

The anchor system 8 is comprised of a ladder lock 2, webbing 5, and hook 7. The ladder lock 2 would match the width specifications for 23, 24, 22, 9 and 5 because those are the units that will be threading into the anchor system 8 via 2. 5 is a piece of webbing that is permanently attached to both 2 and 7. There are four 8s. One for 23 and one for 24 which will anchor into the rear of the automobile. One for 9 and one for 22 which will anchor into the front of the automobile. All 8s are identical and can accept the loose end of either 23, 22, 24, or 9. The hook 7 of the first anchor system 8 would be place inside the lip of the driver's side of the hood of the automobile or any other anchor supporting position on the front of the automobile that is capable of supporting the load without damaging the automobile. The loose end of 22 would then be threaded through the ladder lock 2 of the first anchor system 8 and be tightened to adjust the tension for varying weights of users. A hook 7 of the second anchor system 8 would then be placed inside the lip of the passenger's side of the hood or any other anchor supporting position on the front of the automobile that is capable of supporting the load without damaging the automobile. The loose end of 9 would then be threaded through the ladder lock 2 of the second anchor system 8 and be tightened to adjust the tension for varying weights of users. The hook 7 of the third anchor system 8 would be placed inside the lip of the driver's side of the trunk of the automobile or any other anchor supporting position on the rear of the automobile that is capable of supporting the load without damaging the automobile. The loose end of 23 would then be threaded through the ladder lock 2 of the third anchor system 8 and be tightened to adjust the tension to accompany the varying weights of users. The hook 7 of the forth anchor system 8 would then be placed inside the lip of the passenger's side of the trunk or any other anchor supporting position on the rear of the automobile that is capable of supporting the load without damaging the automobile. The loose end of 24 would then be threaded through the ladder lock 2 of the forth anchor system 8 and be tightened to adjust the tension to accompany the varying weights of users. The order in which the anchor systems are attached to the automobile is arbitrary. It would be preferable for the hooks 7 of the anchor systems 8 to be coated in rubber or other soft material so as not to damage the automobile when 50 is set up.

To set up 50 on an automobile first open all four doors and recline the front seats as far back as possible. Lay 50 on top of the reclined seats so 4 sits with its corners facing diagonally towards each door. Run 13 in between the ajar driver's side door and door jam, run 3 in between the ajar passenger's side door and door jam, and then connect 3 and 13 via 1 by threading the loose end of 3 through the adjustable side of 1. The combination of 3, 1, and 13 should be resting near the middle of the front windshield and should be adjusted so that the 13 end of 16 and the 3 end of 17 are still inside the automobile but nearly touching their respective door jams. Next run 14 in between the ajar passenger's side rear door and door jam, run 15 in between the ajar driver's side door and door jam, and then connect 15 to 14 via 6 by threading the loose end of 15 into the adjustable side of 6. The combination of 14, 6, and 15 should be resting near the middle of the rear windshield and should be adjusted so that the 14 end of 17 and the 15 end of 16 are still inside the automobile but nearly touching their respective door jams. The order in which the front windshield portion or rear windshield portion is set up is arbitrary.

Place two of the anchor systems 8 inside the lip of the hood or other anchor supporting position on the front of the automobile. Thread 22 through the ladder lock 2 of the anchor system 8 that is closest to the driver's side of the automobile and thread 9 through the ladder lock 2 of the anchor system 8 of the passenger's side of the automobile. Once threaded, pull on the loose ends of 9 and 22 so that the apparatus becomes taught. This is best depicted in FIG. 2. The order in which the front end anchor systems are attached to the automobile is arbitrary.

Place the remaining two of the anchor systems 8 inside the lip of the trunk or other anchor supporting position on the rear of the automobile. If using the trunk this may require the trunk to be opened and then closed upon the hooks 7. Thread 23 through the ladder lock 2 of the anchor system 8 that is closest to the driver's side of the automobile and thread 24 through the ladder lock 2 of the anchor system 8 of the passenger's side of the automobile. Once threaded, pull on the loose ends of 23 and 24 so that the apparatus becomes taught. This is best depicted in FIG. 4. The order in which the rear end anchor systems are attached to the automobile is arbitrary.

The order in which the front end anchor systems and rear end anchor systems are attached to the automobile is arbitrary.

Run the loose end of 10 out one of the driver's side door openings, overtop of the automobile, back into the automobile through one of the passenger's side door openings. Thread the loose end of 10 through the adjustable side of 11. Pull on the now threaded loose end of 10 to adjust the height of 4 to comply with the user's preferences. The overhead view in FIG. 5 best depicts the roof strap 10 as it extends over the roof of the automobile.

Once 50 is set up on the automobile the doors of the automobile then close on the webbing. The front driver's side door will close on 13, the front passenger's side front door will close on 3, the rear driver's side door will close on 15, and the rear passenger's side door will close on 14. One door should be left open for the user to be able to get into 50, preferably one of the rear doors. The user would enter 50 through the door that is left ajar. Once inside the automobile and resting on 4 the user can then close the last door of the automobile.

Reversibly, it can be argued that any part of 50 previously described as attaching to the driver's side of an automobile can also be attached to the passenger's side of the automobile and visa versa. And any part of 50 previously described as attaching to the front of an automobile can also be attached to the rear of the automobile and visa versa.

The materials needed to construct 50 would be: webbing, 4 material, four ladder locks 2, three adjustable buckles, four hooks, and attachment material such as thread. 5, 9, 3, 17, 12, 24, 14, 23, 15, 10, 16, 22, and 13 are all made of the chosen webbing material which is generally formed of nylon, polyester, polypropylene or other plant, animal, mineral or synthetic textile with sufficient strength and flexibility to support a portion of 50 during operation or use. The webbing will need to be cut into 11 pieces. 9, 22, 24, and 25 are all relatively the same length. 13, 16, and 15 are all one piece of webbing and 3, 17, and 14 are also all one piece of webbing. The remaining pieces are 10, the four 5s, and 12. Obtain 4 and permanently attach 43 to 17 near 17's midpoint and 44 to 16 near 16's midpoint in a manner that would be secure enough to support the user or users without failing. A suggested method of permanent attachment would be a secure stitch with a durable thread for this permanent attachment and the others herein. Next, permanently attach 9 to 3 near the midpoint of 3, 22 to 13 near the midpoint of 13, 23 to 15 near the midpoint of 15, and 24 to 14 near the midpoint of 14. Then, permanently attach 10 to the midpoint of 16. Thread twelve through the non adjustable side of 11 and then permanently attach the resulting loose ends of 12 to 17 near its midpoint creating a loop where the non adjustable side of 11 resides. To attach 13 to 1, thread the loose end of 13 through the non adjustable side of 1 and fold that loose end back over itself creating a small loop where the non adjustable side of 1 is positioned. Secure the loop with a permanent attachment. 14 is then attached to 6 in the same manner as 13 is to 1.

To construct the anchor systems 8 obtain 5, 2, and 7. 5 will have two loose ends. Thread one loose end through the aperture or hole of 7 that is opposite the hook end. Thread the other loose end of 5 through the non adjustable side of 2. Overlap the remaining loose ends over each other and secure with a permanent attachment. Repeat this process three more times in order to construct all four 8s.

SEQUENCE LISTING

Not applicable

What is claimed is:

1. An exterior-anchored automobile hammock for suspending a person or persons within a four-door automobile, the exterior-anchored automobile hammock comprising:
a main hammock structure that is rectangular in shape, having a horizontally running front dashboard side, a rear backseat side, a longitudinally running driver's side, a longitudinally running passenger's side, a main hammock driver's side webbing, and a main hammock passenger's side webbing, the longitudinally running driver's side is in communication with the main hammock driver's side webbing and the longitudinally running passenger's side is in communication with the main hammock's passenger side webbing;
a roof strap, a roof strap buckle, a roof snap buckle webbing connector, the roof strap is in communication with the main hammock driver's side webbing, the roof strap buckle webbing connector is in communication with the main hammock passenger's side webbing, and the roof strap buckle webbing connector is in communication with the roof strap buckle;

a driver's side windshield strap, a front windshield buckle, a driver's side front anchor strap, the driver's side windshield strap is in communication with the main hammock driver's side webbing, the front windshield buckle, and the driver's side front anchor strap;

a driver's side rear windshield strap, a rear driver's side anchor strap, the driver's side rear windshield strap is in communication with the main hammock driver's side webbing and the rear driver's side anchor strap;

a passenger's side front windshield strap, a passenger's side front anchor strap, the passenger's side front windshield strap is in communication with the main hammock's passenger side webbing and the passenger's side front anchor strap;

a rear windshield passenger's side strap, a rear windshield buckle, a rear passenger's side anchor strap, the rear windshield passenger's side strap is in communication with the rear windshield buckle, the main hammock's passenger side webbing, and the rear passenger's side anchor strap;

a front passenger's side gutter hook, a front passenger's side anchor system webbing, a front passenger's side ladder lock, the front passenger's side anchor system webbing is in communication with the front passenger's side gutter hook and the front passenger's side ladder lock;

a front driver's side gutter hook, a front driver's side anchor system webbing, a front driver's side ladder lock, the front driver's side anchor system webbing is in communication with the front driver's side gutter hook and the front driver's side ladder lock;

a rear passenger's side gutter hook, a rear passenger's side anchor system webbing, a rear passenger's side ladder lock, the rear passenger's side anchor system webbing is in communication with the rear passenger's side gutter hook and the rear passenger's side ladder lock;

a rear driver's side gutter hook, a rear driver's side anchor system webbing, a rear driver's side ladder lock, the rear driver's side anchor system webbing is in communication with the rear driver's side gutter hook and the rear driver's side ladder lock.

2. The exterior-anchored automobile hammock of claim 1, wherein the roof strap is removably received by the roof strap buckle.

3. The exterior-anchored automobile hammock of claim 1, wherein the passenger's side front windshield strap is removably received by the front windshield buckle on the exterior of a front windshield of the automobile.

4. The exterior-anchored automobile hammock of claim 1, wherein the driver's side rear windshield strap is removably received by the rear windshield buckle on the exterior of the rear windshield of a automobile.

5. The exterior-anchored automobile hammock of claim 1, wherein:
the front driver's side ladder lock removably receives the driver's side front anchor strap;
the front passenger's side ladder lock removably receives the passenger's side front anchor strap;
the rear driver's side ladder lock removably receives the rear driver's side anchor strap;
the rear passenger's side ladder lock removably receives the rear passenger's side anchor strap.

6. The exterior-anchored automobile hammock of claim 1, wherein the front driver's side glitter hook and the hunt passenger's side gutter hook removably anchor to the front of the automobile.

7. The exterior-anchored automobile hammock of claim 1, wherein the rear driver's side gutter hook and the rear passenger's side gutter hook removably anchor to the rear of the automobile.

\* \* \* \* \*